US010685609B2

(12) United States Patent
Teranuma

(10) Patent No.: US 10,685,609 B2
(45) Date of Patent: Jun. 16, 2020

(54) LIQUID CRYSTAL DISPLAY DEVICE

(71) Applicant: SHARP KABUSHIKI KAISHA, Sakai, Osaka (JP)

(72) Inventor: Osamu Teranuma, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 169 days.

(21) Appl. No.: 15/739,899

(22) PCT Filed: Jun. 8, 2016

(86) PCT No.: PCT/JP2016/067131
§ 371 (c)(1),
(2) Date: Dec. 26, 2017

(87) PCT Pub. No.: WO2017/002569
PCT Pub. Date: Jan. 5, 2017

(65) Prior Publication Data
US 2018/0182313 A1 Jun. 28, 2018

(30) Foreign Application Priority Data
Jun. 30, 2015 (JP) ................................. 2015-132057

(51) Int. Cl.
G09G 3/36 (2006.01)
G09G 3/20 (2006.01)
(Continued)

(52) U.S. Cl.
CPC .......... G09G 3/36 (2013.01); G02F 1/13306 (2013.01); G06F 3/14 (2013.01); G06F 3/1446 (2013.01);
(Continued)

(58) Field of Classification Search
CPC .......... G09G 3/36; G09G 3/20; G09G 3/2088; G09G 3/3666; G09G 2310/0221;
(Continued)

(56) References Cited

U.S. PATENT DOCUMENTS 6,703,866 B1 * 3/2004 Arimilli ......... H03K 19/017581
326/30
2004/0000924 A1 * 1/2004 Best ................... G06F 13/4072
326/30
(Continued)

FOREIGN PATENT DOCUMENTS

WO 2012/157649 A1 11/2012
WO WO-2016190010 A1 * 12/2016 ............... G09G 3/20

OTHER PUBLICATIONS

"WO2012157649A1—Display device—Google Patents". Google Patents. Online 2019. Retrieved from Internet Aug. 7, 2019. <https://patents.google.com/patent/WO2012157649A1/en?oq=2012%2f157649>. (Year: 2019).*

Primary Examiner — Thomas J. Cleary
(74) Attorney, Agent, or Firm — ScienBiziP, P.C.

(57) ABSTRACT

A liquid crystal display device is disclosed. The liquid crystal display device includes: a display unit; and first to n-th control units configured to control respective areas of the display unit, where n is an integer greater than or equal to 2, wherein: each of the first to (n−1)-th control units is provided with a unidirectional channel linking that control unit to a following one of the control units that is assigned a next greater ordinal number; the n-th control unit is provided with a unidirectional channel linking the control unit to the following, first control unit; and each of the control units, based on a state of that control unit and also on a link signal received from a preceding one of the control
(Continued)

units, transmits a link signal to a following one of the control units and controls an associated one of the areas.

7 Claims, 12 Drawing Sheets

(51) Int. Cl.
    *G06F 3/14* (2006.01)
    *G06F 11/07* (2006.01)
    *G06F 13/40* (2006.01)
    *G02F 1/133* (2006.01)

(52) U.S. Cl.
    CPC ...... *G06F 11/0703* (2013.01); *G06F 13/4004* (2013.01); *G09G 3/20* (2013.01); *G09G 3/2088* (2013.01); *G09G 3/3666* (2013.01); *G09G 2310/0221* (2013.01); *G09G 2330/08* (2013.01); *G09G 2330/12* (2013.01)

(58) Field of Classification Search
    CPC ............ G09G 2330/08; G09G 2330/12; G02F 1/13306; G06F 3/14; G06F 3/1423; G06F 3/1431; G06F 3/1438; G06F 3/1446; G06F 11/07; G06F 11/0703; G06F 11/0751; G06F 11/0766; G06F 11/0772; G06F 11/3003; G06F 11/3041; G06F 13/40; G06F 13/4004; G06F 13/4027; G06F 13/4063
    USPC .......................................................... 345/87
    See application file for complete search history.

(56) References Cited

U.S. PATENT DOCUMENTS

| | | | |
|---|---|---|---|
| 2009/0094658 A1* | 4/2009 | Kobayashi | H04N 5/775 725/118 |
| 2010/0061396 A1* | 3/2010 | Andersson | H01R 31/02 370/463 |
| 2011/0095965 A1* | 4/2011 | Yoneoka | G06F 3/1446 345/1.1 |
| 2012/0319926 A1* | 12/2012 | Koebrich | G09G 5/00 345/1.3 |
| 2014/0092355 A1* | 4/2014 | Teranuma | G02F 1/13306 349/139 |
| 2015/0138252 A1* | 5/2015 | Okano | H04N 21/4318 345/690 |
| 2015/0187238 A1* | 7/2015 | Hall | G06F 3/1446 40/544 |
| 2015/0205565 A1* | 7/2015 | Koguchi | G06F 3/1446 345/1.3 |
| 2015/0269112 A1* | 9/2015 | Hsueh | H04L 25/0272 710/106 |
| 2015/0381954 A1* | 12/2015 | Asamura | H04N 9/3179 348/383 |
| 2016/0062725 A1* | 3/2016 | Odagiri | G06F 3/1446 345/1.3 |

\* cited by examiner

(a) Normal Operation (Normal Display)
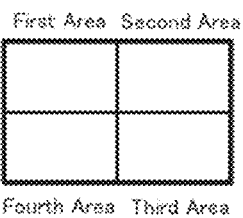

(b) Malfunction in TC2
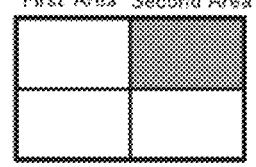

(c) All Control Units in Fail-safe Operation
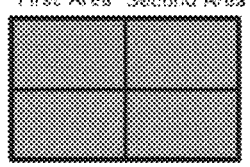

(d) TC2 Has Returned to Normal Operation
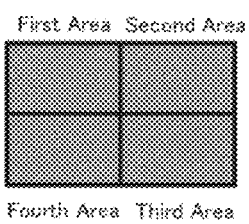

(e) All Control Units Returning to Normal Operation
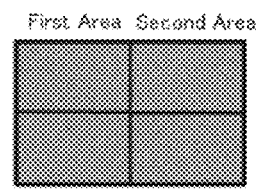

(f) All Control Units Have Returned to Normal Operation
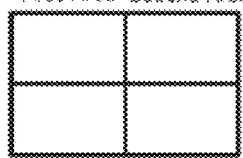

|     | State of CP1 | State of CP2 | State of CP3 | State of CP4 | Description |
| --- | --- | --- | --- | --- | --- |
| (a) | S3 | s3 | s3 | s3 | CP1 to CP4 in s3 (Normal Display across Entire Screen) |
| (b) | S3 | s0 | s3 | s3 | Malfunction in TC2 Enables Fail-safe Operation. CP2 Transitions to s0 (Black Display in Second Area) |
| (c) | S1 | s0 | s1 | s1 | Transition of CP2 to s0 Causes CP1, CP3, and CP4 to transition to S1 (s1) (Black Display across Entire Screen) |
| (d) | S1 | s1 | s1 | s1 | TC2 Returns to Normal Operation. CP2 Transitions to s1 (Black Display across Entire Screen) |
| (e) | S2 | s2 | s2 | s2 | CP2 Spontaneously Transitions to s2. CP1, CP3, and CP4 also Transition to S2 (s2) (Black Display across Entire Screen) |
| (f) | S3 | s3 | s3 | s3 | ransition of CP1 to S2 Causes CP2 to Transition to s3. Latter Transition Causes CP1, CP3, and CP4 to Transition to S3 (s3) (Returns to Normal Display across Entire Screen) |

FIG. 8

| | CP1 | TC1 (Master) State of FS Terminal | Link Control Circuit FP1 (Master) State of FS Terminal | Input | Output |
|---|---|---|---|---|---|
| s0 | Standing by for Fail-safe of CP1 to Be Disabled | L Output to FP | L Input from TC | --- | L |
| s1 | Transient Operating State | L Input from FP | L Output to TC | L | H |
| s2 | Normal Operation | H Input (Hi-z) | H Input (Hi-z) | H | H |
| s0 to s1 | Standing by for Fail-safe of CP1 to Be Disabled →Transient Operating State | L Output to FP →L Input from FP | L Input from TC →L Output to TC | --- | L→H |
| s1 to s0 (t > x) | Transient Operating State→ Standing by for Fail-safe of CP1 to Be Disabled | L Input from FP →L Output to FP | L Output to TC →L Input from TC | L | H→L |
| s1 to s2 | Transient Operating State →Normal Operation | L Input from FP →H Input | L Output to TC →H Input | L→H | H |
| s2 to s0 | Normal Operation→ Standing by for Fail-safe of CP1 to Be Disabled | H Input→ L Output to FP | H Input→ L Input from TC | H | H→L |
| s2 to s1 | Normal Operation → Transient Operating State | H Input→ L Input from FP | H Input→ L Output to TC | H→L | H |

| | CP2 | TC2 (Slave) State of FS Terminal | Link Control Circuit FP2 (Slave) State of FS Terminal | Input | Output |
|---|---|---|---|---|---|
| s0 | Standing by for Fail-safe of CP2 (CP3, CP4) to Be Disabled | L Output to FP | L Input from TC | --- | L |
| s1 | Standing by for Fail-safe of CP1 (CP2, CP3) to Be Disabled | L Input from FP | L Output to TC | H/L | L |
| s2 | Normal Operation | H Input (Hi-z) | H Input (Hi-z) | H | H |
| s0 to s1 | Standing by for Fail-safe of CP2 (CP3, CP4) to Be Disabled →Standing by for Fail-safe of CP1 (CP2, CP3) to Be Disabled | L Output to FP →L Input from FP | L Input from TC →L Output to TC | --- | L |
| s1 to s2 | Standing by for Fail-safe of CP1 (CP2, CP3) to Be Disabled →Normal Operation | L Input from FP →H Input | L Output to TC →H Input | L→H | L→H |
| s2 to s0 | Normal Operation→ Standing by for Fail-safe of CP2 (CP3, CP4) to Be Disabled | H Input → L Output to FP | H Input → L Input from FP | H | H→L |
| s2 to s1 | Normal Operation → Standing by for Fail-safe of CP1 (CP2, CP3) to Be Disabled | H Input→ L Input from FP | H Input→ L Output to FP | H→L | H→L |

| | CP3 & CP4 | TC3, TC4 (Slave) State of FS Terminal | Link Control Circuit FP3, FP4 (Slave) State of FS Terminal | Input | Output |
|---|---|---|---|---|---|
| s0 | Standing by for Fail-safe of CP3 (CP4) to Be Disabled | L Output to FP | L Input from TC | --- | L |
| s1 | Standing by for Fail-safe of CP2 (CP3) to Be Disabled | L Input from FP | L Output to TC | L | L |
| s2 | Normal Operation | H Input (Hi-z) | H Input (Hi-z) | H | H |
| s0 to s1 | Standing by for Fail-safe of CP3 (CP4) to Be Disabled →Standing by for Fail-safe of CP2 (CP3) to Be Disabled | L Output to FP →L Input from FP | L Input from TC →L Output to TC | --- | L |
| s1 to s2 | Standing by for Fail-safe of CP2 (CP3) to Be Disabled →Normal Operation | L Input from FP →H Input | L Output to TC →H Input | L→H | L→H |
| s2 to s0 | Normal Operation→ Standing by for Fail-safe of CP3 (CP4) to Be Disabled | H Input→ L Output to FP | H Input→ L Input from FP | H | H→L |
| s2 to s1 | Normal Operation → Standing by for Fail-safe of CP2 (CP3) to Be Disabled | H Input→ L Input from FP | H Input→ L Output to FP | H→L | H→L |

FIG. 11

(a) Normal Operation (Normal Display)
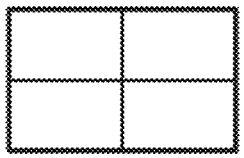

(b) Malfunction in TC2
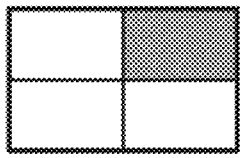

(c) All Control Units in Fail-safe Operation
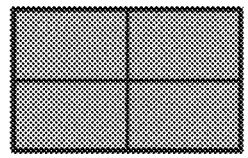

(d) TC2 Has Returned to Normal Operation

(e) All Control Units Have Returned to Normal
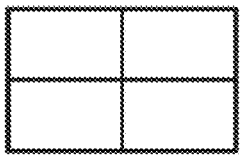

| | State of CP1 | State of CP2 | State of CP3 | State of CP4 | Description |
|---|---|---|---|---|---|
| (a) | S2 | s2 | s2 | s2 | CP1 to CP4 in s2 (Normal Display across Entire Screen) |
| (b) | S2 | s0 | s2 | s2 | Malfunction in TC2 Enables Fail-safe Operation. CP2 Transitions to s0 (Black Display in Second Area) |
| (c) | S1 | s0 | s1 | s1 | Transition of CP2 to s0 Causes CP1, CP3, and CP4 to transition to S1 (s1) (Black Display across Entire Screen) |
| (d) | S1 | s1 | s1 | s1 | TC2 Returns to Normal Operation. CP2 Transitions to s1 (Black Display across Entire Screen) |
| (e) | S2 | s2 | s2 | s2 | CP2 Spontaneously Transitions to s2; CP1, CP3, and CP4 also Transition to S2 (s2) (Black Display across Entire Screen) |

LIQUID CRYSTAL DISPLAY DEVICE

TECHNICAL FIELD

The present invention relates to liquid crystal display devices.

BACKGROUND ART

Patent Literature 1 discloses a fail-safe technique used in large-sized liquid crystal display devices in which a display unit is divided such that the display unit is controlled by a plurality of controllers. In this technique, link signals are transmitted bidirectionally between each controller that controls a portion of the display unit and the other controllers that control the other portions of the display unit so that when there is a malfunction in one of the areas of the display unit, all the other areas are immediately controlled to display a black screen.

CITATION LIST

Patent Literature

Patent Literature 1: PCT International Application Publication, No. WO2012/157649 (Publication Date: May 15, 2012)

SUMMARY OF INVENTION

Technical Problem

The technique disclosed in Patent Literature 1 necessitates a special bidirectional transmission system, which differs from a unidirectional transmission system for sharing common drive and other signals between controllers. This requirement inevitably adds to the size and cost of the control unit.

Solution to Problem

The liquid crystal display device of the present invention includes: a display unit; and first to n-th control units configured to control respective areas of the display unit, where n is an integer greater than or equal to 2, wherein: each of the first to (n−1)-th control units is provided with a unidirectional channel linking that control unit to a following one of the control units that is assigned a next greater ordinal number; the n-th control unit is provided with a unidirectional channel linking the control unit to the following, first control unit; and each of the control units, based on a state of that control unit and also on a link signal received from a preceding one of the control units, transmits a link signal to a following one of the control units and controls an associated one of the areas.

Advantageous Effects of Invention

Link operation (e.g., fail-safe operation) can be carried out, without using a special bidirectional transmission system, in liquid crystal display devices in which a display unit is divided such that the display unit is controlled by a plurality of control units in addition, the size and cost of the control units are reduced.

BRIEF DESCRIPTION OF DRAWINGS

FIG. 2 is a table showing fail-safe-related operating logics in Embodiment 1.

Figure 4:
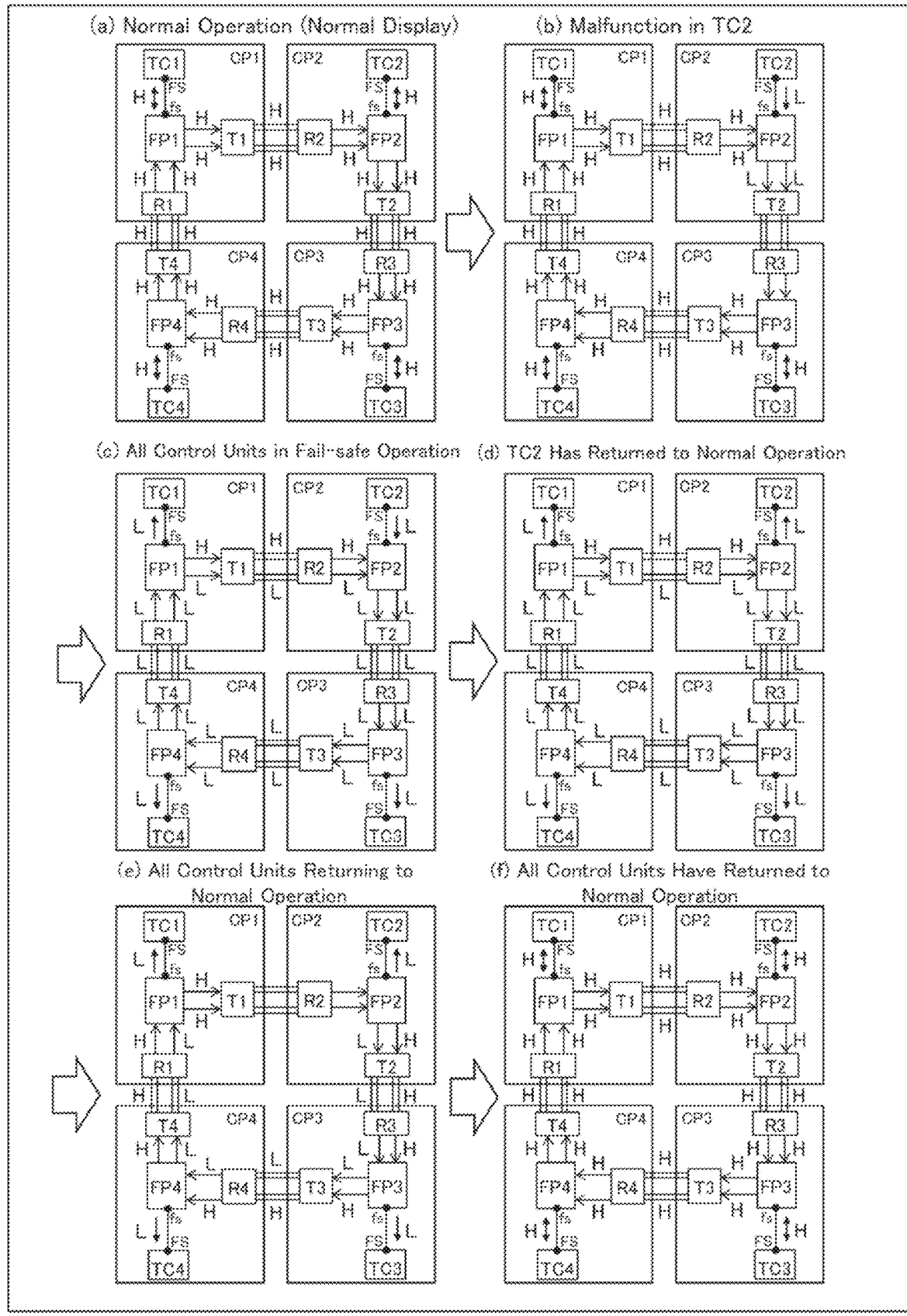

Portions (a) to (f) of FIG. 4 are schematic diagrams depicting state transitions from an occurrence of a malfunction to a return to normal operation in Embodiment 1.

Portions (a) to (f) of FIG. 5 are schematic diagrams illustrating changing displays corresponding to the state transitions in FIG. 4.

Figure 6:
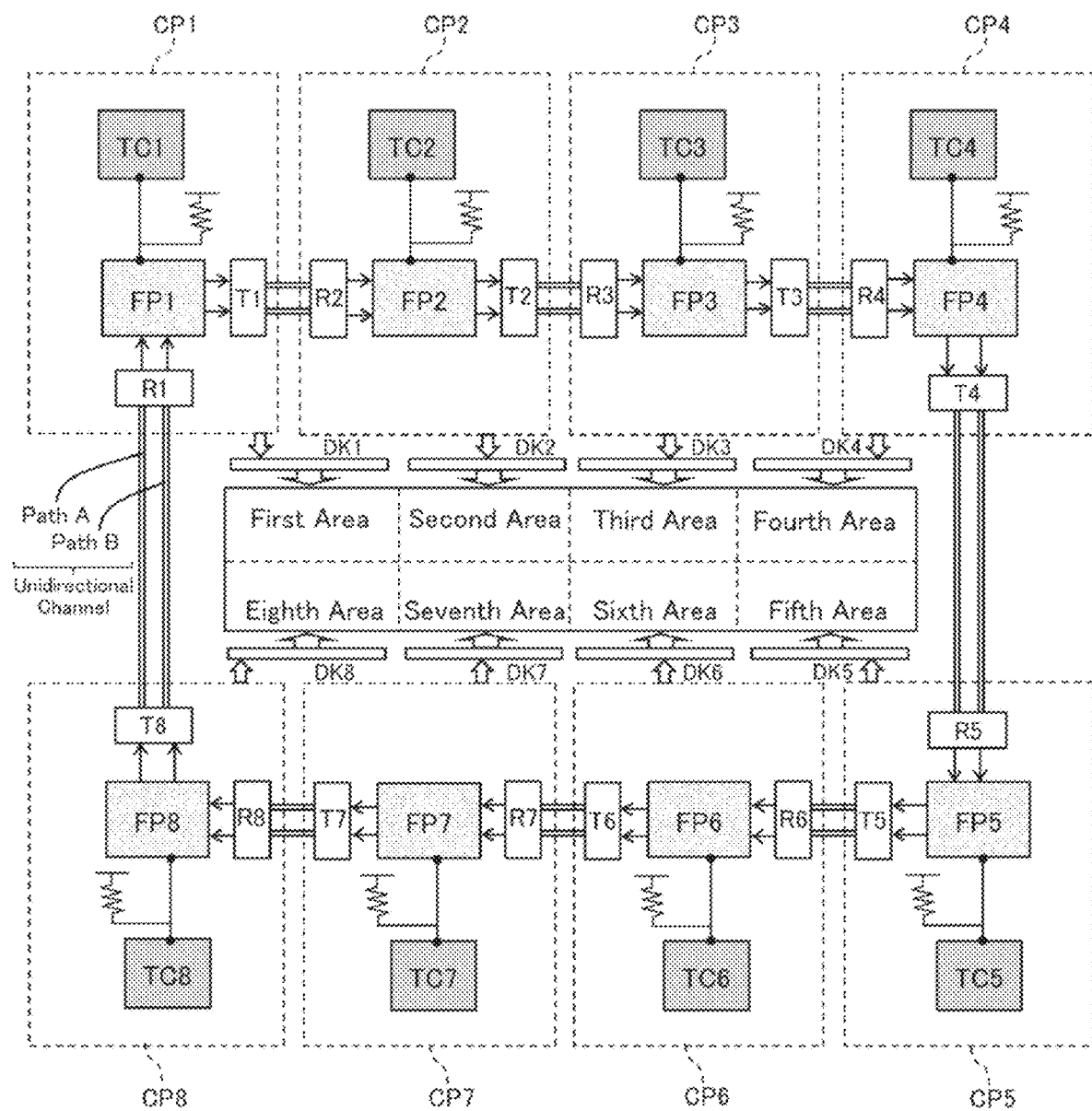

FIG. 6 is a block diagram of a variation example of Embodiment 1.

Figure 7:
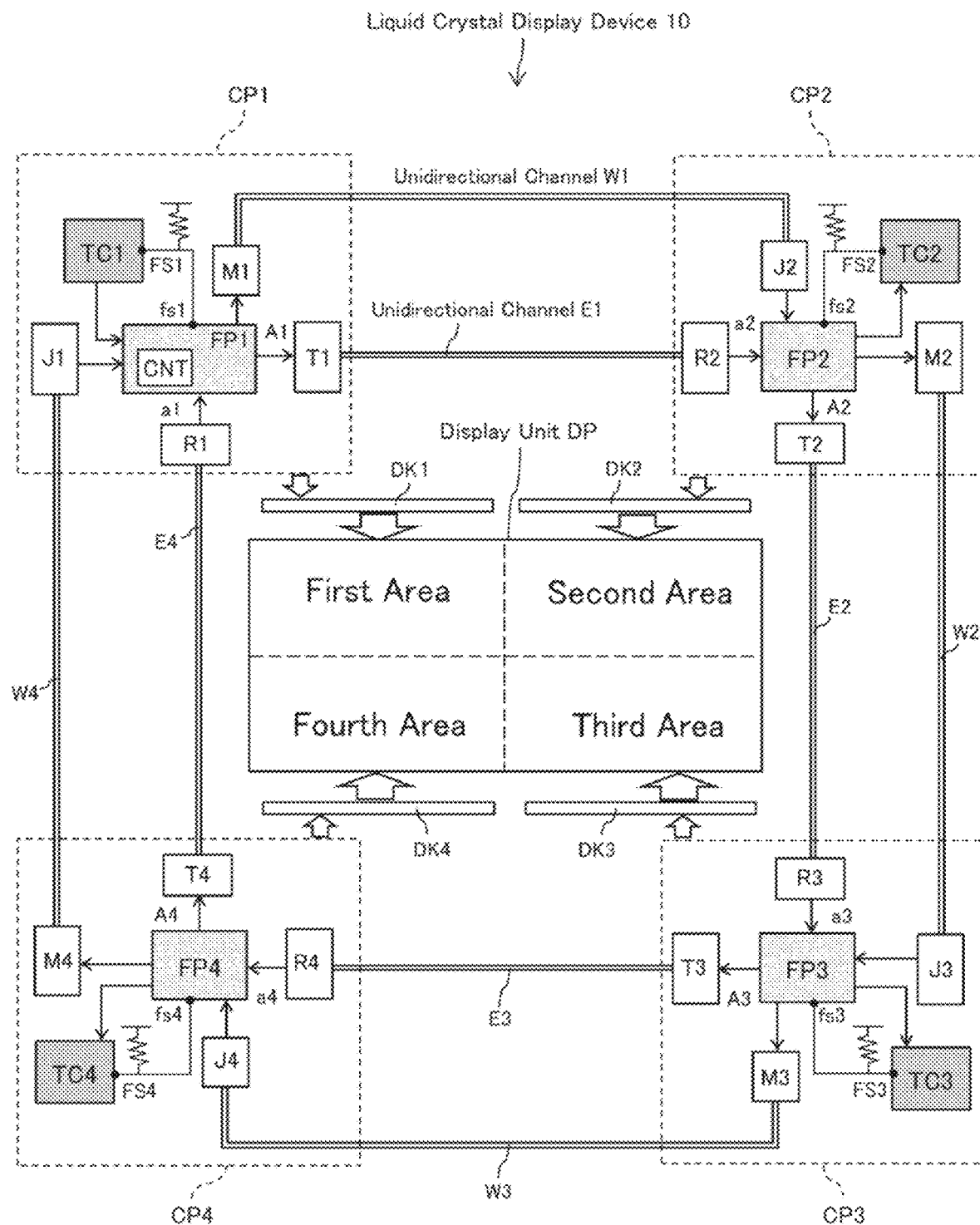

FIG. 7 is a block diagram of a liquid crystal display device in accordance with Embodiment 2.

FIG. 8 is a table showing fail-safe-related operating logics in Embodiment 2.

Figure 9:
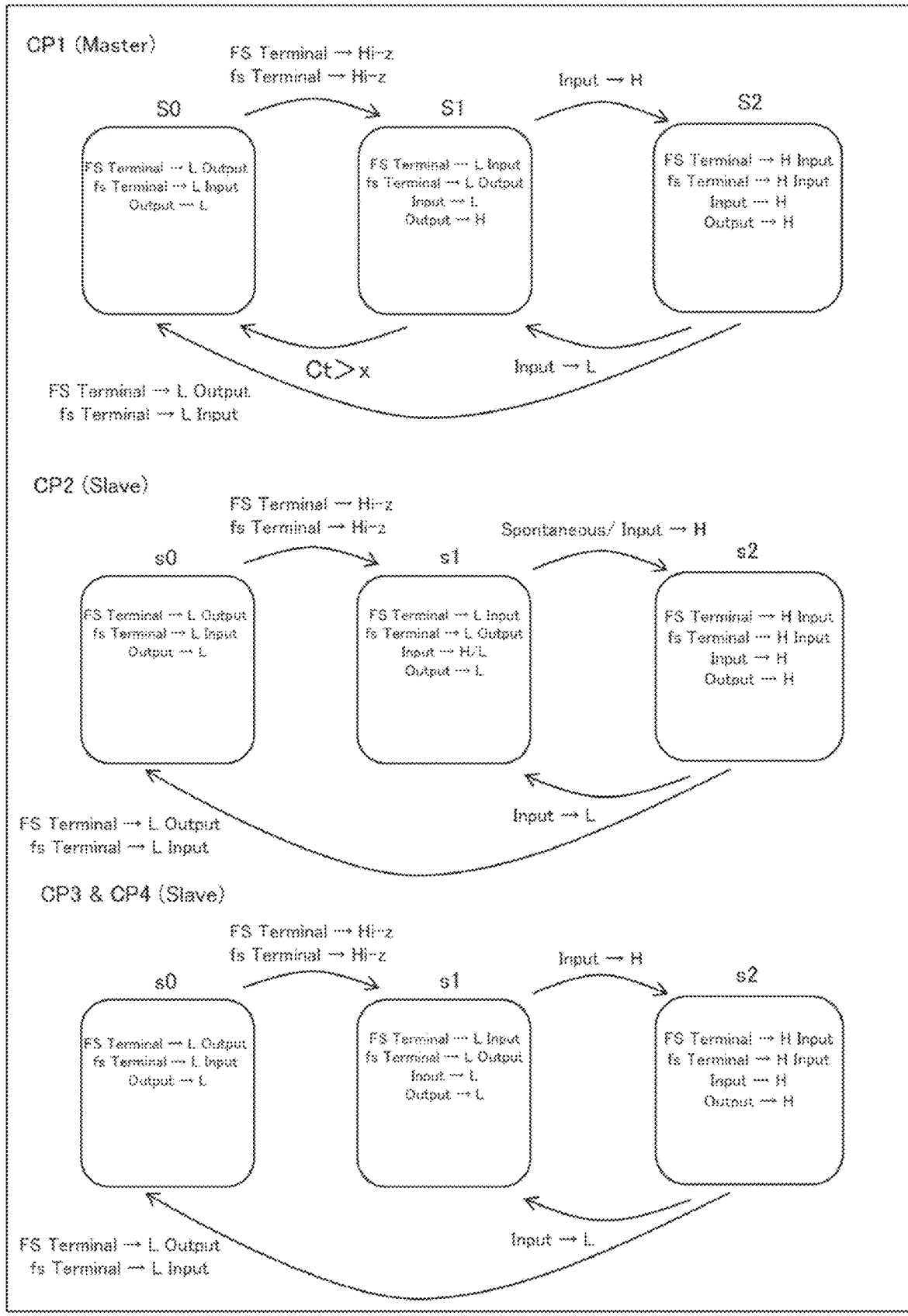

FIG. 9 is a diagram illustrating state transitions in Embodiment 2.

Figure 10:
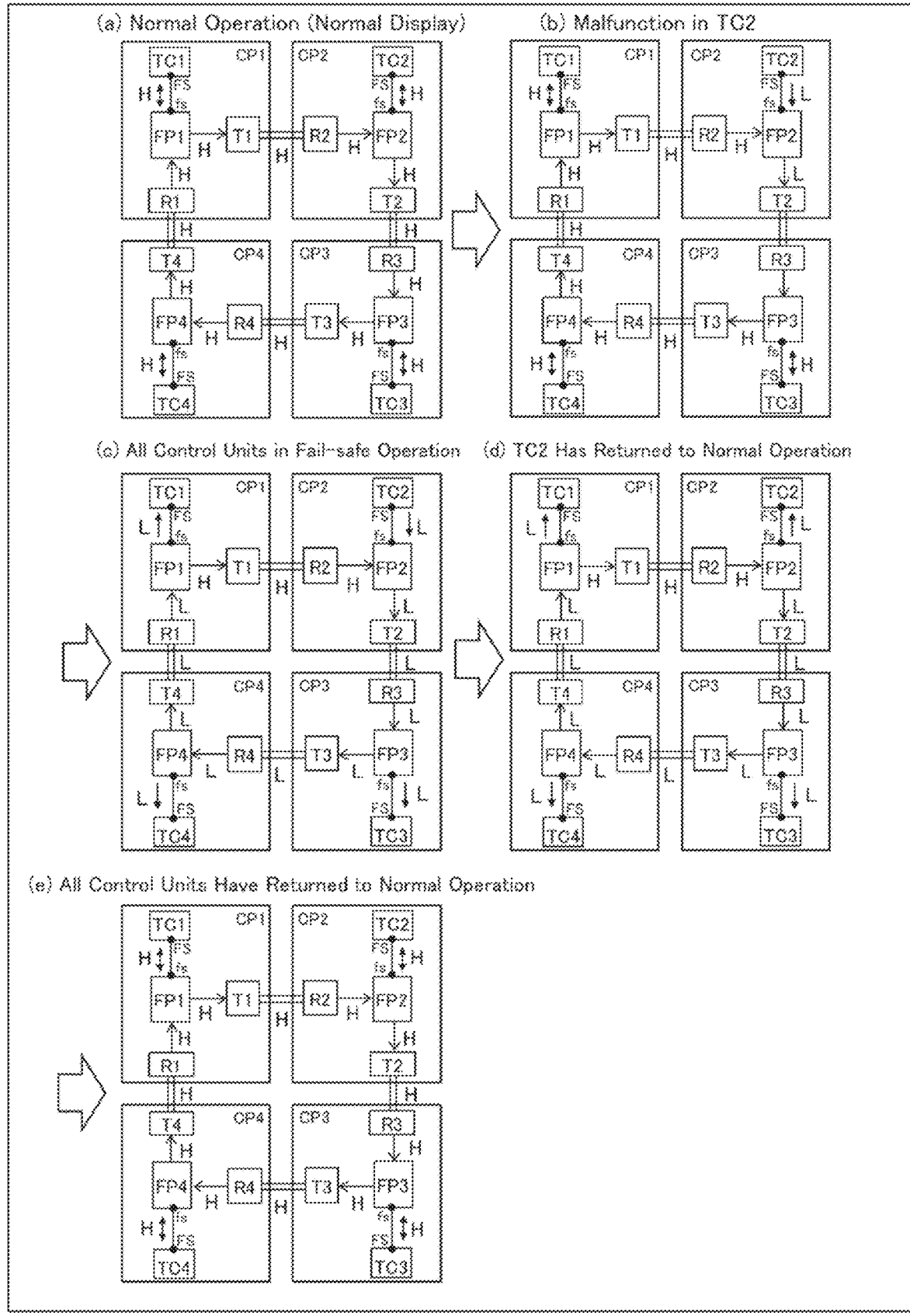

Portions (a) to (e) of FIG. 10 are schematic diagrams depicting state transitions from an occurrence of a malfunction to a return to normal operation in Embodiment 2.

Portions (a) to (e) of FIG. 11 are schematic diagrams illustrating changing displays corresponding to the state transitions in FIG. 10.

Figure 12:
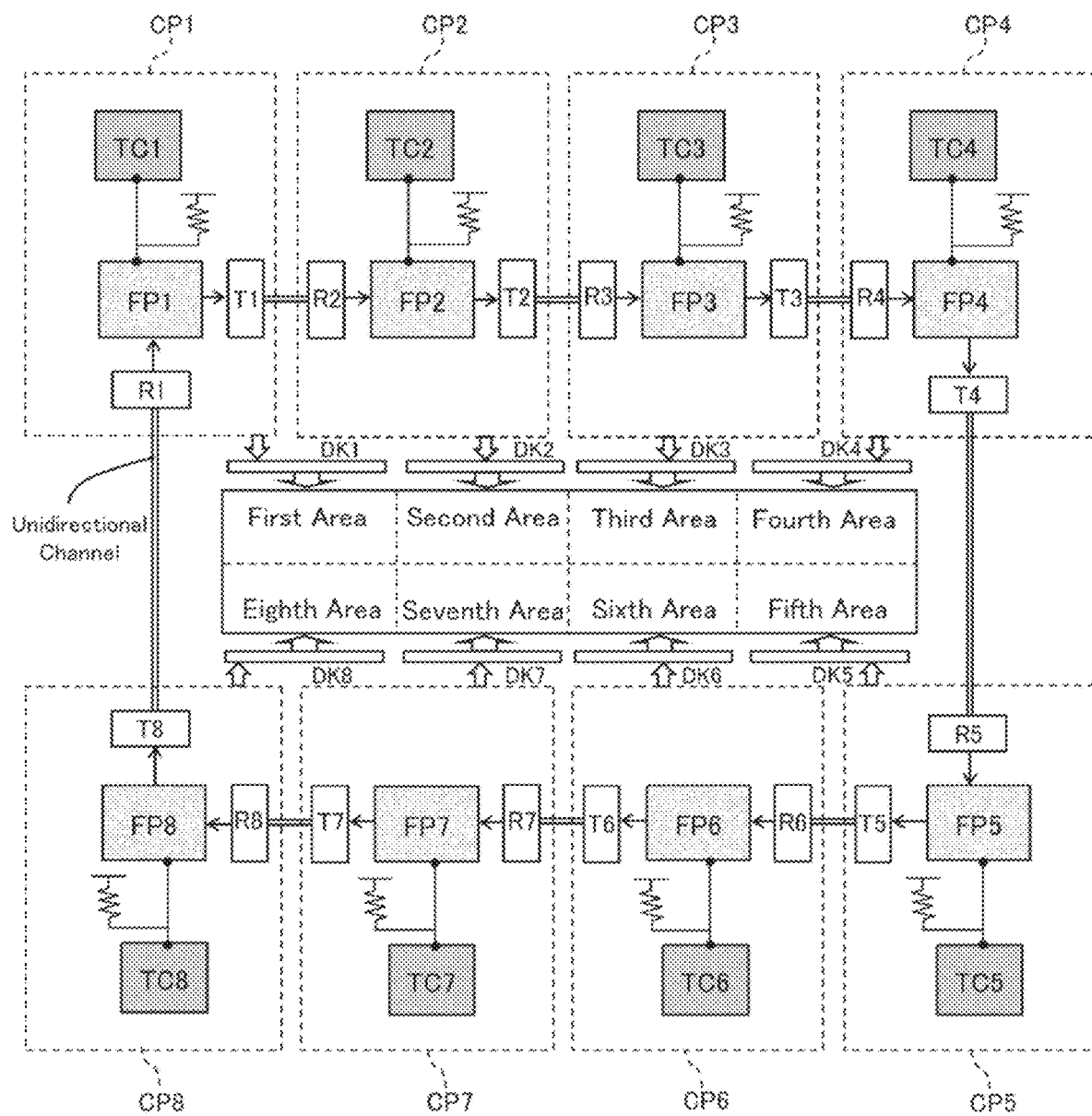

FIG. 12 is a block diagram of a variation example of Embodiment 2.

DESCRIPTION OF EMBODIMENTS

The following will describe embodiments of the present invention in reference to FIGS. 1 to 12.

Embodiment 1

Figure 1:
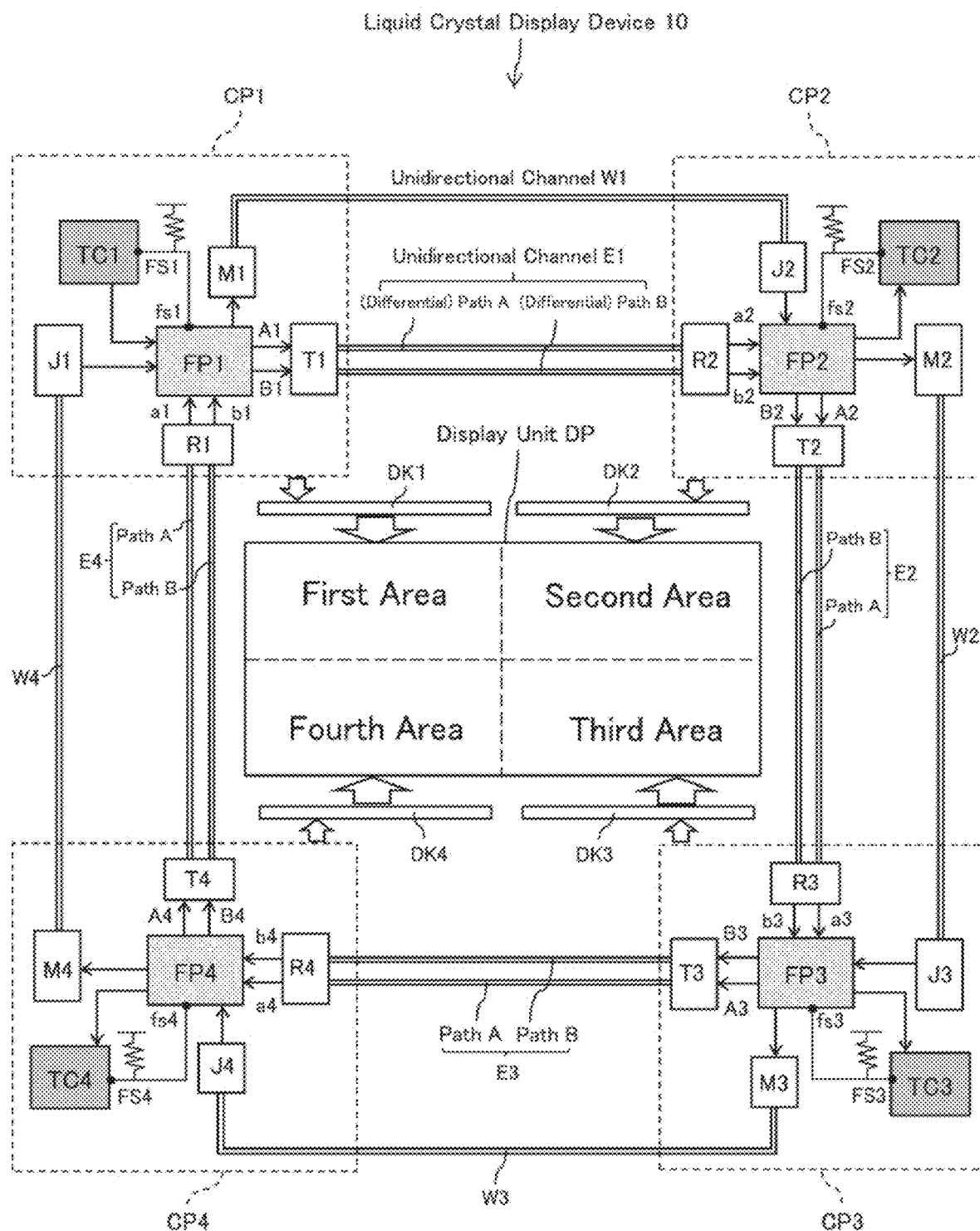
FIG. 1 is a block diagram of a liquid crystal display device in accordance with Embodiment 1.

FIG. 1 is a schematic diagram of a liquid crystal display device in accordance with Embodiment 1. As shown in FIG. 1, a liquid crystal display device 10 includes a display unit DP, control units CP1 to CP4 (first to fourth control units), drive units DK1 to DK4, unidirectional channels W1 and E1, unidirectional channels W2 and E2, unidirectional channels W3 and E3, and unidirectional channels W4 and E4. The display unit DP includes a first area, a second area that is horizontally adjacent to the first area, a third area that is vertically adjacent to the second area, and a fourth area that is vertically adjacent to the first area and horizontally adjacent to the third area. The control units CP1 to CP4 are associated respectively with the first to fourth areas of the display unit DP. The drive units DK1 to DK4 are associated respectively with the first to fourth areas. The unidirectional channels W1 and E1 run from the control unit CP1 to the control unit CP2. The unidirectional channels W2 and E2 run from the control unit CP2 to the control unit it CP3. The unidirectional channels W3 and E3 run from the control unit CP3 to the control unit CP4. The unidirectional channels W4 and E4 run from the control unit CP4 to the control unit CP1.

The display unit DP is built around a large-sized (e.g., 8K×4K pixels) liquid crystal panel including a plurality of pixel electrodes, a plurality of scan signal lines, a plurality of data signal lines, and a plurality of capacitor lines (CS lines) (none of the elements shown). The drive unit DK1 includes a first gate driver and a first source driver. The drive unit DK2 includes a second gate driver and a second source driver. The drive unit DK3 includes a third gate driver and a third source driver. The drive unit DK4 includes a fourth gate driver and a fourth source driver. The control units CP1 to CP4 include respective first to fourth CS drivers.

The control unit CP1 is a master, whilst the control units CP2 to CP4 are slaves. The control units CP1 to CP4 control the respective drivers in the drive units DK1 to DK4 in a synchronized manner. The unidirectional channels W1 to W4, operating in differential mode, are used in the transmission of signals for synchronous drive. Each unidirectional channel E1 to E4 includes a differential-mode path (signal channel) A and a differential-mode path (signal channel) B and is used in the transmission of link signals for fail-safe operations.

The control unit CP1 includes: a timing controller TC1 (with a terminal ES1); a link control circuit FP1 (with a terminal fs1) which is, for example, a general-purpose FPGA; a transmission circuit T1 and a reception circuit R1 both for link signals; and a transmission circuit M1 and a reception circuit J1 both for synchronized drive signals. The control unit CP2 includes: a timing controller TC2 (with a terminal FS2); a link control circuit FP2 (with a terminal fs2) which is, for example, a general-purpose FPGA; a transmission circuit T2 and a reception circuit R2 both for link signals; and a transmission circuit M2 and a reception circuit J2 both for synchronized drive signals. The control unit CP3 includes: a timing controller TC3 (with a terminal FS3); a link control circuit FP3 (with a terminal fs3) which is, for example, a general-purpose FPGA; a transmission circuit T3 and a reception circuit R3 both for link signals; and a transmission circuit M3 and a reception circuit J3 both for synchronized drive signals. The control unit CP4 includes: a timing controller TC4 (with a terminal FS4); a link control circuit FP4 (with a terminal fs4) which is, for example, a general-purpose FPGA; a transmission circuit T4 and a reception circuit R4 both for link signals; and a transmission circuit M4 and a reception circuit J4 both for synchronized drive signals.

The timing controller TC1 in the control unit CP1 controls the drivers in the drive unit DK1 based on a self-generated synchronized drive signal, the state of the timing controller TC1, and the input state of the terminal FS1, and also controls the input to, and output from, the terminal FS1 based on the state of the timing controller TC1. The link control circuit FP1 transmits a synchronized drive signal via the transmission circuit M1 down the unidirectional channel W1. The link control circuit FP1 also transmits, via the transmission circuit T1 down the unidirectional channel E1, link signals received via the reception circuit R1 (i.e., a path-A input a1 and a path-B input bp and link signals corresponding to the input state of the terminal fs1 (i.e., a. path-A output A1 and a path-B output B1). The link control circuit FP1 also controls the input to, and output from, the terminal fs1 based on the received link signals.

The timing controller TC2 in the control unit CP2 controls the drivers in the drive unit DK2 based on the state of the timing controller TC2, the input state of the terminal FS2, and the synchronized drive signal received via the reception circuit J2 and the link control circuit FP2, and also controls the input to, and output from, the terminal FS2 based on the state of the timing controller TC2. The link control circuit FP2 transmits a synchronized drive signal via the transmission circuit M2 down the unidirectional channel W2. The link control circuit FP2 also transmits, via the transmission circuit T2 down the unidirectional channel E2, link signals received via the reception circuit R2 (i.e., a path-A input a2 and a path-B input b2) and link signals corresponding to the input state of the terminal fs2 a path-A output A2 and a path-B output B2). The link control circuit FP2 also controls the input to, and output from, the terminal fs2 based on the received link signals.

The timing controller TC3 in the control unit CP3 controls the drivers in the drive unit DK3 based on the state of the timing controller TC3, the input state of the terminal FS3, and the synchronized drive signal received via the reception circuit J3 and the link control circuit FP3, and also controls the input to, and output from, the terminal FS3 based on the state of the timing controller TC3. The link control circuit FP3 transmits a synchronized drive signal via the transmission circuit M3 down the unidirectional channel W3. The link control circuit FP3 also transmits, via the transmission circuit T3 down the unidirectional channel E3, link signals received via the reception circuit R3 (i.e., a path-A input a3 and a path-B input b3) and link signals corresponding to the input state of the terminal fs3 (i.e., a path-A output A3 and a path-B output 133). The link control circuit FP3 also controls the input to, and output from, the terminal fs3 based on the received link signals.

The timing controller TC4 in the control unit CP4 controls the drivers in the drive unit DK4 based on the state of the timing controller TC4, the input state of the terminal FS4, and the synchronized drive signal received via the reception circuit J4 and the link control circuit FP4, and also controls the input to, and output from, the terminal FS4 based on the state of the timing controller TC4. The link control circuit FP4 transmits a synchronized drive signal via the transmission circuit M4 down the unidirectional channel W4. The link control circuit FP4 also transmits, via the transmission circuit T4 down the unidirectional channel E4, link signals received via the reception circuit R4 (i.e., a path-A input a4 and a path-B input b4) and link signals corresponding to the input state of the terminal fs4 (i.e., a path-A output A4 and a path-B output B4). The link control circuit FP4 also controls the input to, and output from, the terminal fs4 based on the received link signals.

Figure 2:
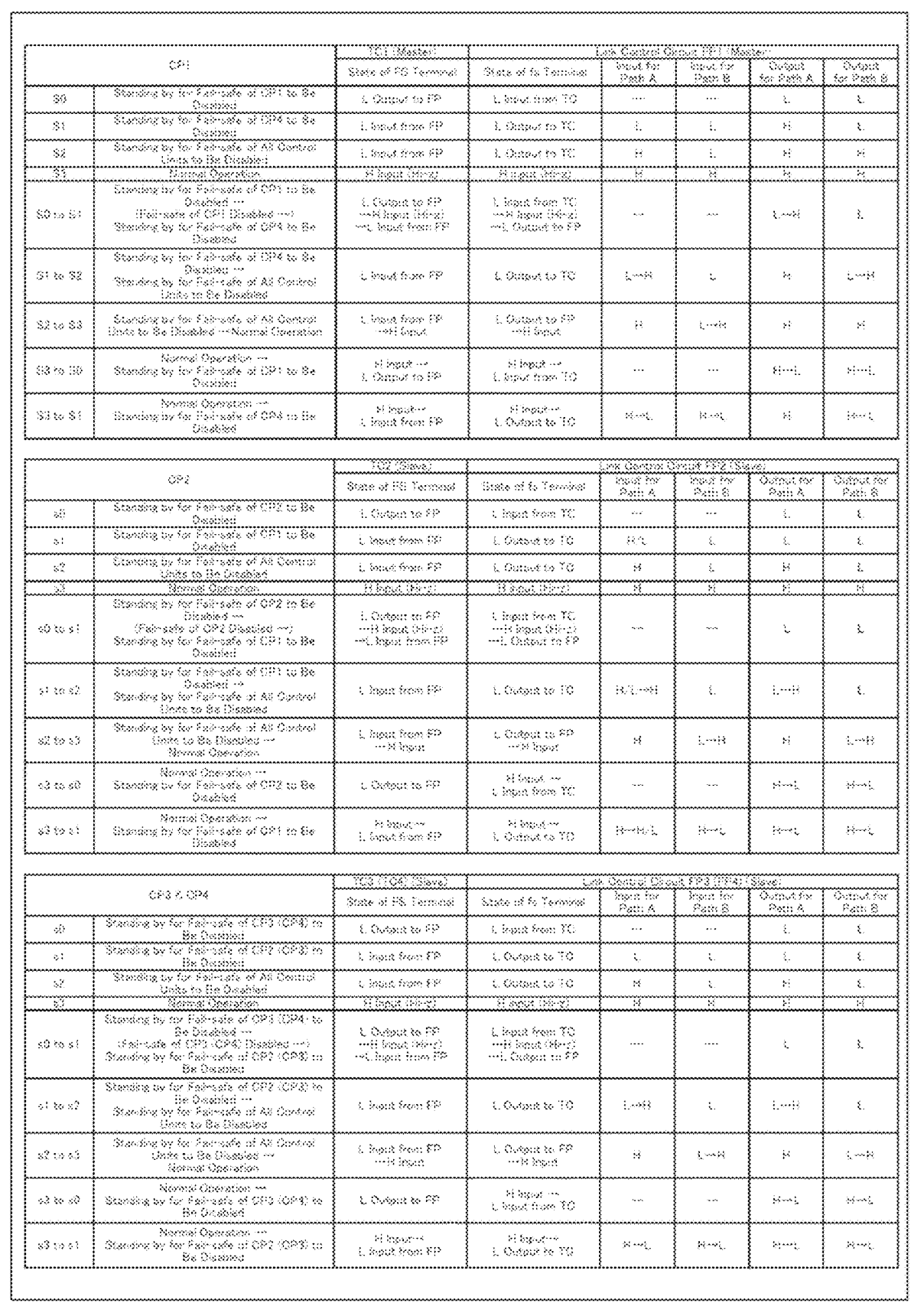
Figure 3:
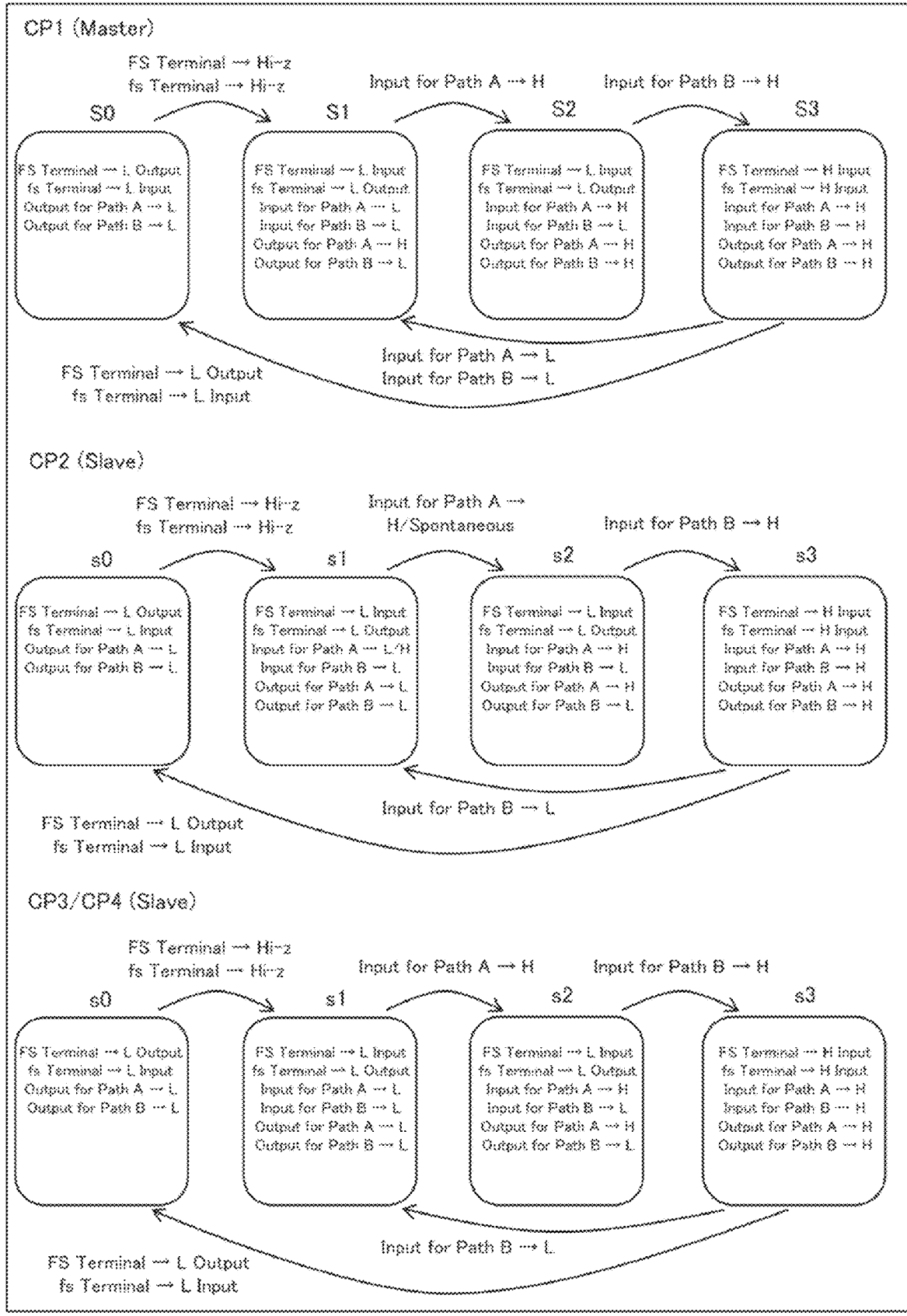
FIG. 3 is a diagram illustrating state transitions in Embodiment 1.

A fail-safe operation of the control unit CP1 is now described in reference to FIGS. 2 and 3. In the following description, a fail-safe enable signal Low is abbreviated to a "L" signal, and a fail-safe disable signal High is abbreviated to a "H" signal.

In state S0 where the control unit CP1 is standing by for a fail-safe operation thereof to be disabled (i.e., a malfunction has occurred in the TC1), a L appears on the terminal FS1 of the TC1 (i.e., a L is applied to the terminal fs1 of the FP1); the link control circuit FP1 transmits link signals (the path-A output A1 is a L, and the path-B output B1 is a L) via the transmission circuit T1 down the unidirectional channel E1; and the free-running control unit CP1 operates to display black in the first area.

In state S1 where the control unit CP1 is standing by for a fail-safe operation of the preceding control unit (CP4) to be disabled (i.e., a malfunction has occurred in one of the TC2 to the TC4), a L appears on the terminal fs1 of the FP1 (i.e., a L is applied to the terminal FS1 of the TC1) based on the link signals received via the reception circuit R1 (the path-A input a1 is a L, and the path-B input b1 is a L); the link control circuit FP1 transmits link signals (the path-A output A1 is a H, and the path-B output B1 is a L) via the transmission circuit T1 down the unidirectional channel E1; and the free-running control unit CP1 operates to display black in the first area.

In state S2 where the control unit CP1 is standing by for a fail-safe operation of all the control units to be disabled (i.e., all the control units are in the process of returning to normal operation), a L appears on the terminal fs1 of the FP1 (i.e., a L is applied to the terminal FS1 of the TC1) based on the link signals received via the reception circuit R1 (the path-A input a1 is a H, and the path-B input b1 is a L); the link control circuit FP1 transmits link signals (the path-A output A1 is a H, and the path-B output B1 is a H) via the transmission circuit T1 down the unidirectional channel E1; and the free-running control unit CP1 operates to display black in the first area.

In state S3 where all the control units are operating normally, both the terminal fs1 of the FP1 and the terminal FS1 of the TC1 change to an input state (high-impedance state, which will be abbreviated to "Hi-z" in the following), and are fed with a H signal by a pull-up circuit, based on the link signals received via the reception circuit R1 (the path-A input a1 is a H, and the path-B input b1 is a H); the link control circuit FP1 transmits link signals (the path-A output A1 is a H, and the path-B output B1 is a H) via the transmission circuit T1 down the unidirectional channel E1; and the control unit CP1, operating normally in synchronism, functions to produce an ordinary display (normal display) in the first area.

As shown in FIGS. 2 and 3, the S0-to-S1 transition is triggered by the terminal FS1 of the TC1 changing from a L output to an input state Hi-z. The S1-to-S2 transition is triggered by the path-A input a1 going H. The S2-to-S3 transition is triggered by the path-B input b1 going H. The S3-to-S1 transition is triggered by both the path-A input a1 and the path-B input b1 going L. The S3-to-S0 transition is triggered by the terminal FS1 of the TC1 changing from an input state Hi-z to a L output (i.e., the input to the terminal fs1 changing from H to L).

A fail-safe operation of the control unit CP2 is now described in reference to FIGS. 2 and 3.

In state s0 where the control unit CP2 is standing by for a fail-safe operation thereof to be disabled (i.e., a malfunction has occurred in the TC2), a L appears on the terminal FS2 of the TC2 (i.e., a L is applied to the terminal fs2 of the FP2); the link control circuit FP2 transmits link signals (the path-A output A2 is a L, and the path-B output B2 is a L) via the transmission circuit T2 down the unidirectional channel E1; and the free-running control unit CP2 operates to display black in the second area.

In state s1 where the control unit CP2 is standing by for a fail-safe operation of the preceding control unit (CP1) to be disabled (i.e., a malfunction has occurred in one of the TC1, the TC3, and the TC4), a L appears on the terminal fs2 of the FP2 (i.e., a L is applied to the terminal FS2 of the TC2) based on the link signals received via the reception circuit R2 (the path-A input a2 is either a H or a L, and the path-B input b2 is a L); the link control circuit FP2 transmits link signals (the path-A output A2 is a L, and the path-B output B2 is a L) via the transmission circuit 12 down the unidirectional channel E2; and the free-running control unit CP2 operates to display black in the second area.

In state s2 where the control unit CP2 is standing by for a fail-safe operation of all the control units to be disabled (i.e., all the control units are in the process of returning to normal operation), a L appears on the terminal fs2 of the FP2 (i.e., a L is applied to the terminal FS2 of the TC2) based on the link signals received via the reception circuit R2 (the path-A input a2 is a H, and the path-B input b2 is a L); the link control circuit FP2 transmits link signals (the path-A output A2 is a H, and the path-B output B2 is a L) via the transmission circuit T2 down the unidirectional channel E2; and the free-running control unit CP2 operates to display black in the second area.

In state s3 where all the control units are operating normally, both the terminal fs2 of the FP2 and the terminal FS2 of the TC2 change to an input state, and are fed with a H signal by a pull-up circuit, based on the link signals received via the reception circuit R2 (the path-A input a2 is a H, and the path-B input b2 is a H); the link control circuit FP2 transmits link signals (the path-A output A2 is a H, and the path-B output B2 is a H) via the transmission circuit T2 down the unidirectional channel E2; and the control unit CP2, operating normally in synchronism, functions to produce an ordinary display (normal display) in the second area.

As shown in FIGS. 2 and 3, the s0-to-s1 transition is triggered by the terminal FS2 of the TC2 changing from a L output to an input state Hi-z. The s1-to-s2 transition is triggered by the path-A input a2 going H when the path-A input a2 is a L (when there is a malfunction in the TC1), whereas when the path-A input a2 is a H (when there is no malfunction in the TC1), the s1-to-s2 transition occurs spontaneously. The s2-to-s3 transition is triggered by the path-B input b2 going H. The s3-to-s1 transition is triggered by both the path-A input a2 and the path-B input b2 going L. The s3-to-s0 transition is triggered by the terminal FS2 of the TC2 changing from an input state Hi-z to a L output (i.e., the input to the terminal fs2 changing from H to L).

A fail-safe operation of the control unit CP3 is now described in reference to FIGS. 2 and 3.

In state s0 where the control unit CP3 is standing by for a fail-safe operation thereof to be disabled (i.e., a malfunction has occurred in the TC3), a L appears on the terminal FS3 of the TC3 (i.e., a L is applied to the terminal fs3 of the FP3); the link control circuit FP3 transmits link signals (the path-A output A3 is a L, and the path-B output B3 is a L) via the transmission circuit T3 down the unidirectional channel E1; and the free-running control unit CP3 operates to display black in the third area.

In state s1 where the control unit CP3 is standing by for a fail-safe operation of the preceding control unit (CP2) to be disabled (i.e., a malfunction has occurred in one of the TC1, the TC2, and the TC4), a L appears on the terminal fs3 of the FP3 (i.e., a L is applied to the terminal FS3 of the TC3) based on the link signals received via the reception circuit R3 (the path-A input a3 is a L, and the path-B input b3 is a L); the link control circuit FP3 transmits link signals (the path-A output A3 is a L, and the path-B output B3 is a L) via the transmission circuit T3 down the unidirectional channel E3; and the free-running control unit CP3 operates to display black in the third area.

In state s2 where the control unit CP3 is standing by for a fail-safe operation of all the control units to be disabled (i.e., all the control units are in the process of returning to normal operation), a L appears on the terminal fs3 of the FP3 (i.e., a L is applied to the terminal FS3 of the TC3) based on the link signals received via the reception circuit R3 (the path-A input a3 is a H, and the path-B input b3 is a L); the link control circuit FP3 transmits link signals (the path-A output A3 is a H, and the path-B output B3 is a L) via the transmission circuit T3 down the unidirectional channel E3; and the free-running control unit CP3 operates to display black in the third area.

In state s3 where all the control units are operating normally, both the terminal fs3 of the FP3 and the terminal FS3 of the TC3 change to an input state, and are fed with a H signal by a pull-up circuit, based on the link signals received via the reception circuit R3 (the path-A input a3 is a H, and the path-B input b3 is a H); the link control circuit FP3 transmits link signals (the path-A output A3 is a H, and the path-B output B3 is a H) via the transmission circuit T3 down the unidirectional channel E3; and the control unit CP3, operating normally in synchronism, functions to produce an ordinary display (normal display) in the third area.

As shown in FIGS. 2 and 3, the s0-to-s1 transition is triggered by the terminal FS3 of the TC3 changing from a L output to an input state Hi-z. The s1-to-s2 transition is triggered by the path-A input a3 going H. The s2-to-s3 transition is triggered by the path-B input b3 going H. The s3-to-s1 transition is triggered by both the path-A input a3 and the path-B input b3 going L. The s3-to-s0 transition is triggered by the terminal FS3 of the TC3 changing from an input state Hi-z to a L output (i.e., the input to the terminal fs3 changing from H to L).

A fail-safe operation of the control unit CP4 is now described in reference to FIGS. 2 and 3.

In state s0 where the control unit CP4 is standing by for a fail-safe operation thereof to be disabled (i.e., a malfunction has occurred in the TC4), a L appears on the terminal FS4 of the TC4 (i.e., a L is applied to the terminal fs4 of the FP4); the link control circuit FP4 transmits link signals (the path-A output A4 is a L, and the path-B output B4 is a L) via the transmission circuit T4 down the unidirectional channel E1; and the free-running control unit CP4 operates to display black in the fourth area.

In state s1 where the control unit CP4 is standing by for a fail-safe operation of the preceding control unit (CP3) to be disabled (i.e., a malfunction has occurred in one of the TC1 to the TC3), a L appears on the terminal fs4 of the FP4 (i.e., a L is applied to the terminal FS4 of the TC4) based on the link signals received via the reception circuit R4 (the path-A input a4 is a L, and the path-B input b4 is a L); the link control circuit FP4 transmits link signals (the path-A output A4 is a L, and the path-B output B4 is a L) via the transmission circuit T4 down the unidirectional channel E4; and the free-running control unit CP4 operates to display black in the fourth area.

In state s2 where the control unit CP4 is standing by for a fail-safe operation of all the control units to be disabled (i.e., all the control units are in the process of returning to normal operation), a L appears on the terminal fs4 of the FP4 (i.e., a L is applied to the terminal FS4 of the TC4) based on the link signals received via the reception circuit R4 (the path-A input a4 is a H, and the path-B input b4 is a L); the link control circuit FP4 transmits link signals (the path-A output A4 is a H, and the path-B output B4 is a L) via the transmission circuit T4 down the unidirectional channel E4; and the free-running control unit CP4 operates to display black in the fourth area.

In state s3 where all the control units are operating normally, both the terminal fs4 of the FP4 and the terminal FS4 of the TC4 change to an input state, and are fed with a H signal by a pull-up circuit, based on the link signals received via the reception circuit R4 (the path-A input a4 is a H, and the path-B input b4 is a H); the link control circuit FP4 transmits link signals (the path-A output A4 is a H, and the path-B output B4 is a H) via the transmission circuit T4 down the unidirectional channel E4; and the control unit CP4, operating normally in synchronism, functions to produce an ordinary display (normal display) in the fourth area.

As shown in FIGS. 2 and 3, the s0-to-s1 transition is triggered by the terminal FS4 of the TC4 changing from a L output to an input state Hi-z. The s1-to-s2 transition is triggered by the path-A input a4 going H. The s2-to-s3 transition is triggered by the path-B input b4 going H. The s3-to-s1 transition is triggered by both the path-A input a4 and the path-B input b4 going L. The s3-to-s0 transition is triggered by the terminal FS4 of the TC4 changing from an input state Hi-z to a L output (the input of the terminal fs4 changing from H to L).

The following will describe in reference to FIGS. 4 to 5 a situation in which there has occurred a malfunction in the timing controller TC2 of the control unit CP2.

In FIGS. 4(a) and 5(a), the control units CP1 to CP4 are in state S3 (s3), operating normally (i.e., producing a normal display across the entire screen).

In FIGS. 4(b) and 5(b), when there occurs a malfunction in the TC2, a fail-safe operation of the control unit CP2 is enabled, and the control unit CP2 transitions to state s0. Therefore, the second area turns into a black display. Meanwhile, the control units CP1, CP3, and CP4 remain in state S3 (s3).

In FIGS. 4(c) and 5(c), the transition of the control unit CP2 to state s0 causes a transition of the control units CP1, CP3, and CP4 to S1 (s1), which results in a black display across the entire screen.

In FIGS. 4(d) and 5(d), the TC2 returns to a normal state, and the control unit CP2 transitions to state s1. Meanwhile, the control units CP1, CP3, and CP4 remain in state S1 (s1), thereby continuously displaying black across the entire screen.

Since the input a2 is a H, the control unit CP2, having transitioned to state s1 in response to the return of the TC2 to normal operation, spontaneously transitions to state s2. This transition causes a transition of the control units CP3 and CP4 to same state s2 as shown in FIGS. 4(e) and 5(e). Black is continuously displayed across the entire screen.

Subsequently, the control unit CP1 transitions to state S2, and both the outputs A1 and B1 of the FP1 go H (disable) (both the inputs a2 and b2 of the CP2 go H). That causes the control unit CP2 to transition to state s3, which in turn causes the control units CP1, CP3, and CP4 to also transition to same state S3 (s3) as in as in FIGS. 4(f) and 5(f). All the control units CP1 to CP4 hence return to normal operation, thereby producing a normal display across the entire screen.

Embodiment 1, as detailed above, achieves a fail-safe operation in a unidirectional transmission system without having to provide a special bidirectional transmission system, thereby allowing for size and cost reduction of the control units.

In Embodiment 1, the display unit DP is divided into four areas for which the control units CP1 to CP4 are provided respectively. This is however not the only possible implementation of the invention. Alternatively, the display unit DP may be divided into eight areas (two rows×four columns of areas) for which there are provided respective control units CP1 to CP8, as shown in FIG. 6. In this configuration, as an example, the control unit CP1 may be a master, whilst the control units CP2 to CP8 may be slaves. Operating logics for the control units CP1 to CP4 in FIG. 6 may be the same as those for the control units CP1 to CP4 in FIG. 2, whereas operating logics for the control units CP5 to CP8 in FIG. 6 may be similar to those for the control units CP3 and CP4 in FIG. 2. As another alternative, Embodiment 1 in include only two control units.

Embodiment 2

In Embodiment 1, there are provided both a differential-mode path A and a differential-mode path B for each unidirectional channel E1 to E4. This is however not the only possible implementation of the invention. Alternatively, the path B may be removed from the configuration in FIG. 1. This alternative configuration is shown in FIG. 7 where there is provided only one differential-mode path for each unidirectional channel E1 to E4 and there is additionally provided a time counter CNT in the link control circuit FP1 of the control unit CP1.

A fail-safe operation of the control unit CP1 in FIG. 7 is now described in reference to FIGS. 8 and 9. In the following description, a fail-safe enable signal Low is abbreviated to a "L" signal, and a fail-safe disable signal High is abbreviated to a "H" signal.

In state S0 where the control unit CP1 is standing by for a fail-safe operation thereof to be disabled (i.e., a malfunction has occurred in the TC1), a L appears on the terminal FS1 of the TC1 (i.e., a L is applied to the terminal fs1 of the FP1); the link control circuit FP1 transmits a link signal (the output A1 is a L) via the transmission circuit T1 down the unidirectional channel E1; and the free-running control unit CP1 operates to display black in the first area.

In transient operating state S1, a L appears on the terminal fs1 of the FP1 (i.e., a L is applied to the terminal FS1 of the TC1) based on the link signal received via the reception circuit R1 (the input a1 is a L); the link control circuit FP1 transmits a link signal (the output A1 is a H) via the transmission circuit T1 down the unidirectional channel E1; and the free-running control unit CP1 operates to display black in the first area.

In state S1, the time counter CNT measures time Ct elapsed since the output A1 went H with the input a1 being a L. If the elapsed time Ct exceeds a specified period of time x, and the input a1 still remains L (fail-safe enable), the control unit CP1 is forcibly transitioned to S0.

In state S2 where all the control units are operating normally, both the terminal fs1 of the FP1 and the terminal FS1 of the TC1 change to an input state, and are fed with a H signal by a pull-up circuit, based on the link signal received via the reception circuit R1 (the input a1 is a H); the link control circuit FP1 transmits a link signal (the output A1 is a H) via the transmission circuit T1 down the unidirectional channel E1; and the control unit CP1, operating normally in synchronism, functions to produce an ordinary display (normal display) in the first area.

As shown in FIGS. 8 to 9, the S0-to-S1 transition is triggered by the terminal FS1 of the TC1 changing from a L output to an input state Hi-z. The S1-to-S2 transition is triggered by the input a1 going H. The S2-to-S1 transition is triggered by the input a1 going L. The S1-to-S0 transition is triggered by the input a1 remaining L when the time Ct elapsed since the output A1 went H exceeds the specified period of time x. The S2-to-S0 transition is triggered by the terminal FS1 of the TC1 changing from an input state Hi-z to a L output (i.e., the input to the terminal fs1 changing from H to L).

A fail-safe operation of the control unit CP2 will be described in reference to FIGS. 8 and 9.

In state s0 where the control unit CP2 is standing by for a fail-safe operation thereof to be disabled (i.e., a malfunction has occurred in the TC2), a L appears on the terminal FS2 of the TC2 (i.e., a L is applied to the terminal fs2 of the FP2); the link control circuit FP2 transmits a link signal (the output A2 is a L) via the transmission circuit T2 down the unidirectional channel E1; and the free-running control unit CP2 operates to display black in the second area.

In state s1 where the control unit CP2 is standing by for a fail-safe operation of the preceding control unit (CP1) to be disabled (i.e., a malfunction has occurred in one of the TC1, the TC3, and the TC4), a L appears on the terminal fs2 of the FP2 (i.e., a L is applied to the terminal FS2 of the TC2) based on a link signal received via the reception circuit R2 (the input a2 is either a H or a L); the link control circuit FP2 transmits a link signal (the output A2 is a L) via the transmission circuit T2 down the unidirectional channel E2; and the free-running control unit CP2 operates to display black in the second area.

In state s2 where all the control units are operating normally, both the terminal fs2 of the FP2 and the terminal FS2 of the TC2 change to an input state, and are fed with a H signal by a pull-up circuit, based on the link signal received via the reception circuit R2 (the input a2 is a H); the link control circuit FP2 transmits a link signal (the output A2 is a H) via the transmission circuit T2 down the unidirectional channel E2; and the control unit CP2, operating normally in synchronism, functions to produce an ordinary display (normal display) in the second area.

As shown in FIGS. 8 to 9, the s0-to-s1 transition is triggered by the terminal FS2 of the TC2 changing from a L output to an input state Hi-z. The s1-to-s2 transition is triggered by the input a2 going H when the input a2 is a L, whereas when the input a2 is a H, the s1-to-s2 transition occurs spontaneously. The s2-to-s1 transition is triggered by the input a2 going L. The s2-to-s0 transition is triggered by the terminal FS2 of the TC2 changing from an input state Hi-z to a L output (i.e., the input to the terminal fs2 changing from H to L).

A fail-safe operation of the control unit CP3 will be described in reference to FIGS. 8 and 9.

In state s0 where the control unit CP3 is standing by for a fail-safe operation thereof to be disabled (i.e., a malfunction has occurred in the TC3), a L appears on the terminal FS3 of the TC3 (i.e., a L is applied to the terminal fs3 of the FP3); the link control circuit FP3 transmits a link signal (the output A3 is a L) via the transmission circuit T3 down the unidirectional channel E1; and the free-running control unit CP3 operates to display black in the third area.

In state s1 where the control unit CP3 is standing by for a fail-safe operation of the preceding control unit (CP2) to be disabled (i.e., a malfunction has occurred in one of the TC1, the TC2, and the TC4), a L appears on the terminal fs3 of the FP3 (i.e., a L is applied to the terminal FS3 of the TC3) based on the link signal received via the reception circuit R3 (the input a3 is a L); the link control circuit FP3 transmits a link signal (the output A3 is a L) via the transmission circuit T3 down the unidirectional channel E3; and the free-running control unit CP3 operates to display black in the third area.

In state s2 where all the control units are operating normally, both the terminal fs1 of the FP1 and the terminal FS1 of the TC1 change to an input state, and are fed with a H signal by a pull-up circuit, based on the link signal received via the reception circuit R1 (the input a1 is a H); the link control circuit FP1 transmits a link signal (the output A1 is a H) via the transmission circuit T1 down the unidirectional channel E1; and the control unit CP1, operating normally in synchronism, functions to produce an ordinary display (normal display) in the first area.

As shown in FIGS. 8 to 9, the s0-to-s1 transition is triggered by the terminal FS3 of the TC3 changing from a L output to an input state Hi-z. The s1-to-s2 transition is triggered by the input a3 going H. The s2-to-s1 transition is triggered by the input a3 going L. The s2-to-s0 transition is triggered by the terminal FS3 of the TC3 changing from an input state Hi-z to a L output (i.e., the input to the terminal fs3 changing from H to L). The description about the control unit CP3 applies also to the control unit CP4.

The following will describe in reference to FIGS. 10 to 11 a situation in which there has occurred a malfunction in the timing controller TC2 of the control unit CP2.

In FIGS. 10(a) and 11(a), the control units CP1 to CP4 are in state S2 (s2), operating normally (i.e., producing a normal display across the entire screen).

In FIGS. 10(b) and 11(b), when there occurs a malfunction in the TC2, a fail-safe operation of the control unit CP2 is enabled, and the control unit CP2 transitions to state s0. Therefore, the second area turns into a black display. Meanwhile, the control units CP1, CP3, and CP4 remain in state S2 (s2).

In FIGS. 10(c) and 11(c), the transition of the control unit CP2 to state s0 causes a transition of the control units CP1, CP3, and CP4 to S1 (s1), which results in a black display across the entire screen.

In FIGS. 10(d) and 11(d), the TC2 returns to a normal state, and the control unit CP2 transitions to state s1. Meanwhile, the control units CP1, CP3, and CP4 remain in state S1 (s1), thereby continuously displaying black across the entire screen.

Since the input a2 is a H, the control unit CP2, having transitioned to state s1 in response to the return of the TC2 to normal operation, spontaneously transitions to state s2 (i.e., the output A2 changes from L (enable) to H (disable)), This transition causes a transition of the control units CP1, CP3, and CP4 to same state S2 (s2) as shown in FIGS. 10(e) and 11(e). All the control units CP1 to CP4 hence return to normal operation, thereby producing a normal display across the entire screen.

Embodiment 2, as detailed above, achieves a fail-safe operation in a unidirectional transmission system without having to provide a special bidirectional transmission system, thereby allowing for size and cost reduction of the control units.

In Embodiment 2, the display unit DP is divided into four areas for which the control units CP1 to CP4 are provided respectively. This is however not the only possible implementation of the invention. Alternatively, the display unit DP may be divided into eight areas (two rows×four columns of areas) for which there are provided respective control units CP1 to CP8, as shown in FIG. 12. In this configuration, as an example, the control unit CP1 may be a master, whilst the control units CP2 to CP8 may be slaves. Operating logics for the control units CP1 and CP2 in FIG. 6 may be the same as those for the control units CP1 and CP2 in FIG. 8, whereas operating, logics for the control units CP3 to CP8 in FIG. 12 may be similar to those for the control units CP3 and CP4 in FIG. 8. As another alternative, Embodiment 2 may include only two control units.

The present invention is not limited to the description of the embodiments and examples above. Proper variations and combinations of the embodiments and examples in view of general technical knowledge are encompassed in the technical scope of the present invention.

Overview

The present invention, in a first aspect thereof, is directed to a liquid crystal display device including: a display unit; and first to n-th control units configured to control respective areas of the display unit, where n is an integer greater than or equal to 2, wherein: each of the first to (n−1)-th control units is provided with a unidirectional channel linking that control unit to a following one of the control units that is assigned a next greater ordinal number; the n-th control unit is provided with a unidirectional channel linking the control unit to the following, first control unit; and each of the control units, based on a state of that control unit and also on a link signal received from a preceding one of the control units, transmits a link signal to a following one of the control units and controls an associated one of the areas.

In a second aspect of the present invention, the liquid crystal display device of the first aspect may be configured such that: each of the unidirectional channels includes first and second paths; and each of the control units, upon a malfunction thereof, outputs a fail-safe enable signal as a link signal to both the first and second paths and produces a predetermined display in an associated one of the areas.

In a third aspect of the present invention, the liquid crystal display device of the second aspect may be configured such that each of the control units, after returning to normal operation, outputs a disable signal through the first path and outputs an enable signal through the second path and produces the predetermined display in an associated one of the areas.

In a fourth aspect of the present invention, the liquid crystal display device of the third aspect may be configured such that each of the second to n-th control units, while operating normally, passes on an incoming link signal as is to a following one of the control units.

In a fifth aspect of the present invention, the liquid crystal display device of the fourth aspect may be configured such that: the first control unit, upon receiving a disable signal through the first path and an enable signal through the second path while operating normally, outputs a disable signal to both the first and second paths and produces the predetermined display in the associated, first area; and each of the second to n-th control units, upon receiving a disable signal through the first path and an enable signal through the second path while operating normally, outputs a disable signal through the first path and an enable signal through the second path and produces the predetermined display in an associated one of the areas.

In a sixth aspect of the present invention, the liquid crystal display device of the fifth aspect may be configured such that each of the control units, only while receiving a disable signal from both the first and second paths while operating normally, outputs a disable signal to both the first and second paths and produces a normal display in an associated one of the areas.

In a seventh aspect of the present invention, the liquid crystal display device of the first aspect may be configured such that: each of the unidirectional channels includes a single path; and each of the control units, upon a malfunction thereof, outputs a fail-safe enable signal as a link signal and produces a predetermined display in an associated one of the areas.

In an eighth aspect of the present invention, the liquid crystal display device of the seventh aspect may be configured such that each of the control units, after returning to normal operation, outputs a disable signal and produces the predetermined display in an associated one of the areas.

In a ninth aspect of the present invention, the liquid crystal display device of the eighth aspect may be configured such that each of the second to n-th control units, while operating normally, passes on an incoming link signal as is to a following one of the control units.

In a tenth aspect of the present invention, the liquid crystal display device of the ninth aspect may be configured such that the first control unit, upon receiving an enable signal while continuously receiving an enable signal for a specified period of time after outputting a disable signal, outputs an enable signal instead of the disable signal.

In an eleventh aspect of the present invention, the liquid crystal display device of the tenth aspect may be configured such that each of the control units, only while receiving a disable signal while operating normally, outputs a disable signal and produces a normal display in an associated one of the areas.

In a twelfth aspect of the present invention, the liquid crystal display device of any one of the first to eighth aspects may be configured such that the predetermined display is a black display.

In a thirteenth aspect of the present invention, the liquid crystal display device of any one of the first to twelfth aspects may be configured such that each of the unidirectional channels includes at least one differential signal channel.

INDUSTRIAL APPLICABILITY

The liquid crystal display device of the present invention is particularly suited for large-sized liquid crystal televisions and other like displays.

REFERENCE SIGNS LIST

10 Liquid Crystal Display Device
DP Display Unit
CP1 to CP8 Control Unit
DK1 to DK8 Drive Unit
TC1 to TC8 Timing Controller
FR1 to FR8 Link Control IC
Tf1 to Tf4 Transmission Unit (for Link Signals)
Td to Td4 Transmission Unit (for Synchronized Driving)
Rf1 to Rf4 Reception Unit (for Link Signals)
Rd1 to Rd4 Reception Unit (for Synchronized Driving)
a1 to a4 A (Path) Input
b1 to b4 B (Path) Input
A1 to A4 A (Path) Output
B1 to B4 B (Path) Output
FS Fail-safe Terminal of Timing Controller
fs Fail-safe Terminal of Link Control IC
E1 to E4 Unidirectional Channel (for Link Signals)
W1 to W4 Unidirectional Channel (for Synchronized Driving)
H High (Disable Signal)
L Low (Enable Signal)

The invention claimed is:

1. A liquid crystal display device, comprising:
a liquid crystal panel; and
first to n-th control circuits corresponding to respective areas of the liquid crystal panel, where n is an integer greater than or equal to 2,
wherein:
letting 1≤m≤n−1, each m-th control circuit is provided with a unidirectional channel linking the m-th control circuit to the following, (m+1)-th control circuit;
the n-th control circuit is provided with a unidirectional channel linking the n-th control circuit to the following, first control circuit;
each of the control circuits
comprises a reception circuit configured to receive an incoming link signal from a preceding one of the control circuits via the unidirectional channel and a transmission circuit configured to transmit an outgoing link signal to a following one of the control circuits via the unidirectional channel,
transmits the outgoing link signal based on the incoming link signal and a state of that control circuit, and controls a corresponding one of the areas;
one of the control circuits is a master control circuit, and the other control circuits are slave control circuits,
each unidirectional channel comprises first and second signal channels;
the incoming link signal comprises a first incoming signal and a second incoming signal;
the reception circuit receives the first incoming signal via the first signal channel and the second incoming signal via the second signal channel;
the outgoing link signal comprises a first outgoing signal and a second outgoing signal;
the transmission circuit transmits the first outgoing signal via the first signal channel and the second outgoing signal via the second signal channel;
the first and second signal channels are capable of transmitting different signals and same signals; and
the master control circuit, after returning to normal operation from a malfunction thereof, outputs a disable signal as either one of the first and second outgoing signals and an enable signal as the other one of the first and second outgoing signals and produces a predetermined display in an associated one of the areas.

2. The liquid crystal display device according to claim 1, wherein each of the control circuits, upon a malfunction thereof, outputs an enable signal as the first outgoing signal and an enable signal as the second outgoing signal and produces a predetermined display in an associated one of the areas.

3. The liquid crystal display device according to claim 1, wherein each of the slave control circuits, while operating normally, outputs a signal that is identical to the incoming link signal as the outgoing link signal.

4. The liquid crystal display device according to claim 1, wherein the master control circuit, when either one of the first and second incoming signals is a disable signal and the other one of the first and second incoming signals is an enable signal while operating normally, outputs a disable signal as the first outgoing signal and a disable signal as the second outgoing signal and produces a predetermined display in a corresponding area.

5. The liquid crystal display device according to claim 1, wherein each of the control circuits, upon receiving a disable signal as the first incoming signal and a disable signal as the second incoming signal while operating normally, outputs a disable signal as the first outgoing signal and a disable signal as the second outgoing signal and produces a normal display in an associated one of the areas.

6. The liquid crystal display device according to claim 2, wherein the predetermined display is a black display.

7. The liquid crystal display device according to claim 1, wherein each of the unidirectional channels comprises at least one differential signal channel.

* * * * *